March 12, 1968     C. BLOOM     3,372,863
ENCLOSED MOTOR DRIVEN COMPRESSOR UNIT
Filed April 26, 1966     2 Sheets-Sheet 2

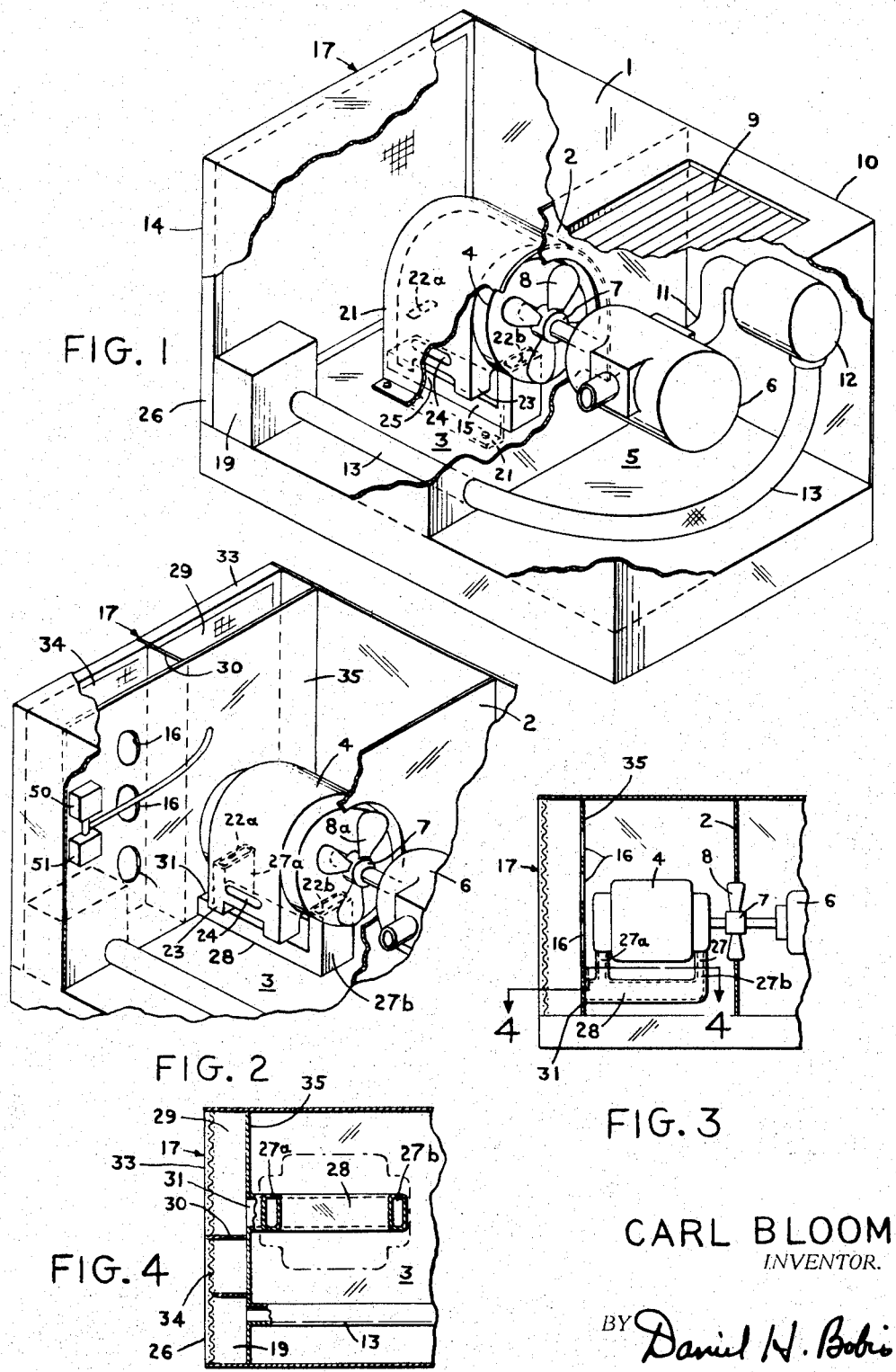

CARL BLOOM
INVENTOR.
BY Daniel H. Bobis
Atty

United States Patent Office 3,372,863
Patented Mar. 12, 1968

3,372,863
ENCLOSED MOTOR DRIVEN COMPRESSOR UNIT
Carl Bloom, Springfield, Mass., assignor to Worthington Corporation, Harrison, N.J., a corporation of Delaware
Filed Apr. 26, 1966, Ser. No. 545,311
6 Claims. (Cl. 230—117)

ABSTRACT OF THE DISCLOSURE

A cooling means for an enclosed fan cooled industrial compressor and motor unit wherein the enclosure for the unit is divided by means of a partition into a first compartment containing the motor and a second compartment containing the compressor, the partition being provided with an opening through which the driving shaft of the motor is connected to the driven shaft of the compressor and in which a fan is to be mounted for rotation and to draw air from an opening in the first compartment and over said motor and discharge the same through said second compartment, and the suction of the compressor in the second compartment receives an independent source of cooler denser filtered air from outside the enclosure.

---

This invention relates generally to a motor driven compressor unit, and more particularly to an enclosed fan cooled motor driven compressor unit.

In enclosed rotary industrial air compressor units, it is advantageous to flow cooling air across the motor to reduce motor temperature at increasing or high loads, because this helps to prevent reduction of motor life and failure of the motor.

In prior art devices, as shown in U.S. Patent 3,156,409, a separately mounted blower and motor has been disposed above the compressor motor of the rotary compressor unit, so that it may blow air for cooling purposes down upon the motor, across the unit, and up through the top of the enclosure. There is also provided supercharged air from within the enclosure to the compressor inlet.

The present invention provides a simple and reliable cooling means for an enclosed fan cooled industrial compressor and motor unit wherein the enclosure for the unit is divided by means of a partition into a first compartment containing the motor and a second compartment containing the compressor, the partition being provided with an opening through which the driving shaft of the motor is connected to the driven shaft of the compressor and in which a fan is to be mounted for rotation and to draw air from an opening in the first compartment, and over said motor and discharge the same through said second compartment, and the suction of the compressor in the second compartment receives an independent source of cooler denser filtered air from outside the enclosure.

Accordingly, it is an object of this invention to provide an improved fan operated air cooling system for an enclosed industrial compressor unit wherein the air cooling means is mounted on the shaft of the compressor motor.

It is another object of this invention to provide an enclosed motor compressor unit which unit has a separate filtered air inlet for the compressor to draw air from without the enclosure, and a fan cooled motor.

It is another object of this invention to provide an air cooling system for an enclosed motor-compressor unit wherein air is drawn at a high velocity through the motor, resulting in acceptable winding temperatures for high loads.

It is still another object of this invention to provide an air cooling system for an enclosed motor-compressor unit wherein the motor is cooled by filtered air flowing through air channel means which coact with said motor and the enclosure to provide a steady flow of cooling air through the motor as the means filtering said air becomes clogged.

These and other objects and advantages of this invention will become evident from the following description with reference to the accompanying drawings in which:

FIGURE 1 is a cut-away view of an enclosed motor-compressor unit;

FIGURE 2 is an alternate embodiment of the invention;

FIGURE 3 is a partial side view of the alternate embodiment shown in FIGURE 2;

FIGURE 4 is a section taken along the line 4—4 of FIGURE 3; and

Figure 5:
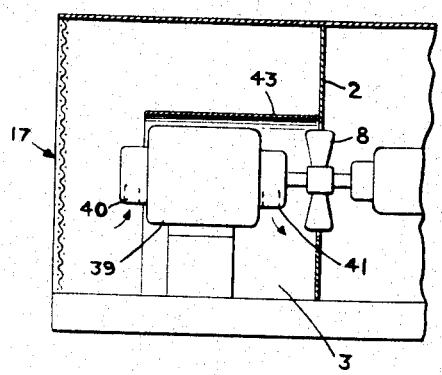
FIGURES 5 and 6 illustrate additional alternative embodiments of this invention.

Referring to the figures, FIGURE 1 shows a compressor and motor unit totally enclosed in a sheet metal or other suitable enclosure 1. Only the basic elements of the motor-compressor unit are shown, although other well known elements may also be present in the enclosure, such as an oil cooler, receiver, etc. The enclosure is divided by a partition 2 into two compartments; the first compartment 3 containing the motor 4 and the second compartment 5 containing the compressor 6. The motor and compressor are coupled together in any suitable fashion, as by coupling 7. A fan 8 for cooling purposes is preferably mounted on the coupling between the two compartments in the plane of the partition 2.

The compartment containing the compressor has a grill 9 in its top 10 for exhaustion of cooling air. In units using air cooled oil coolers (not shown), the grill may be replaced by the oil cooler.

The compressor inlet 11 communicates directly with an air filter 12. The conduit 13 from the compressor inlet air filter 12 is connected to and communicates with a small enclosure or box 19. This box communicates the compressor inlet air filter directly with the panel filter 17, so that air is drawn by the compressor directly from without the enclosure 1 through the panel filter, and is not drawn from within the enclosure 1.

A shroud 21 is shown disposed about the motor 4 and in contact with the partition 2. Air inlets 22a and 22b are shown located at each end of the motor casing 23, and air outlets 24 are located on either side of the motor casing. The air outlets communicate with the space 25 between the shroud and the motor casing.

The shroud 21 stops before reaching the rear of the motor, leaving the rear motor inlet 22a free to take in air at the enclosure pressure. Extending from the front motor inlet 22b is a duct 15 leading to the area at the rear of the motor, which duct permits the front motor inlet to take in air at the enclosure pressure.

When the compressor 6 is operating, the fan 8 draws air into the enclosure through the panel filter 17. As the air moves through compartment 3, the shroud 21 covering the electric motor 4 causes a high velocity, low pressure air stream adjacent to the side air outlets 24 of the motor in the space 25. This results in a pressure differential between the motor air inlets 22a and 22b and the outlets 24, thereby increasing the flow of cooling air through the motor and resulting in an acceptable winding temperature for high loads. The high velocity air in space 25 also helps cool the motor by removing heat from the motor surface.

Simultaneously, air for the compressor intake 11 is drawn from outside the enclosure 1 through that portion 26 (FIGURES 1 and 4) of the panel filter 17 which is adjacent to the small enclosure 19. This results in denser air at the compressor suction 11, as compared with air drawn from within the enclosure 1 itself. It can be shown that air drawn from the compartment 5 housing the compressor has a lower density than air drawn from outside the enclosure. This density occurs because the effect of a high temperature in decreasing the air density, as would be the case if air were drawn from within the enclosure, is greater than the effect of a slightly higher pressure in increasing the air density. Increased air density at the compressor suction increases the compressor capacity.

As depicted, suction air for the compressor is drawn initially through the panel filter at 26, thereby undergoing a preliminary cleaning, and extending the life of the suction filter 12. This air is cooler and consequently denser than the air that is available around the compressor within the enclosure which has drawn off the heat from the motor windings and from hot surfaces in the compressor compartment.

An alternative embodiment of this invention is shown in FIGURES 2, 3 and 4. Referring to these figures, air ducts 27a and 27b are shown connected to the air inlets 22a and 22b of the motor casing 23. These air ducts communicate with air duct manifold 28 which is connected to the internal wall 35. Air duct manifold 28 communicates with a separate compartment 29 formed between wall 35, the panel filter 17, and the divider 30. As can be seen in FIGURES 2 and 4, compartment 29 is sealed from first compartment 3, and communicates only with the air manifold 28 at connection 31.

The divider 30 may be omitted when space 29 has a small depth, since the space 29 will itself provide a restriction to the flow of air which the divider 30 is intended to block.

The compartment 29 thus formed is exposed to a larger area 33 of the filter 17 than the adjoining portion 34 of the filter 17. Air entering through that portion 34 of the filter 17 cannot communicate directly with the motor compartment 3. Rather it must pass through the restrictions 16 in internal wall 35. The shroud 21 (FIGURE 1) is unnecessary in this embodiment.

In the operation of this alternative embodiment, a smaller fan 8a evacuates the motor compartment 3 causing a pressure differential between the motor air inlets 22a and 22b and the outlets 24, thereby causing air to flow over and through the motor 4. This cooling air allows the motor to run at a higher than normal load without exceeding normal motor temperatures.

The importance of maintaining low motor winding temperatures may be gauged by noting that motor life is reduced in half for each rise of approximately 10° C. in winding temperature, and that such a rise results from an overload of only 10 to 15 percent. Excess cooling air supplied by this method easily allows an increase of 15 to 25 percent in load, while maintaining normal motor temperature and life.

The motor life is further increased and the enclosure maintained clean by filtering the incoming air. The buildup of dirt on the panel filter 17 will normally quickly restrict the flow of cooling air through the motor. However, in this alternative embodiment, the filter section 34 cleaning the cooling air passing into the motor compartment 3, builds up a pressure drop faster than the filter section 33 cleaning the air moving through the compartment 29 and internally through the motor, because the section 34 is smaller in area relative to its air flow than the section 33. This results in a reduction in total air flow through the enclosure, and in an increase in the vacuum in the motor compartment 3 due to the fan characteristic of increasing vacuum with decreasing flow. This increasing vacuum helps maintain a steady flow through the motor as the filter section 33 adjacent to the compartment 29, cleaning the motor cooling air, becomes clogged, thereby lengthening the intervals between filter cleaning.

A second advantage of having a separate filtered air supply 34 or bypass air flow to the motor compartment 3, results from the improved external cooling of the motor and other electrical devices in the motor compartment.

A third advantage of the bypass air flow is the reduction it allows in the closeness with which the ducts 27a and 27b must be sealed to the air inlets 22a and 22b of the motor. Since motors vary in contour, exact sealing of a duct to a motor without resorting to some cumbersome gap filling material is difficult to achieve. Such exact sealing is less necessary with the arrangement shown, since leakage from the air ducts 27a and 27b to the motor compartment 3 constitutes a small percentage of the total air flow, when bypassed air is added to motor air, and therefore has a reduced adverse effect on the ability of the fan 8 to maintain a proper vacuum in the motor compartment 3.

In order to determine when the panel filters 17 need cleaning, a manometer 50 may be used to sense a vacuum either in the compartment 29 leading to the motor inlet manifold 28, or alternatively, in the motor compartment 3. As further alternative, the differential pressure between these two compartments could be measured.

If additional protection against reduced cooling air flow from dirty panel filters is required, a differential pressure switch 51 may be used to shutdown the machine or actuate a signal device when the pressures sensed indicate an insufficiency of cooling air.

Figure 6:
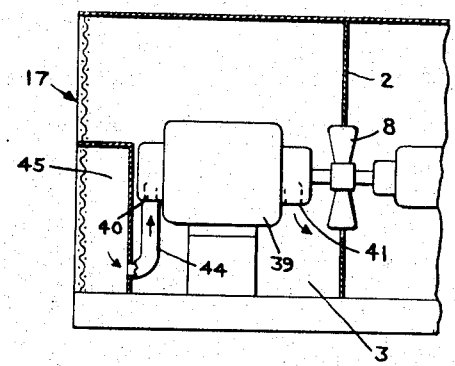

FIGURES 5 and 6 depict motors 39 which draw their cooling air into an inlet 40 at the rear of the motor and discharge it from an outlet 41 at the front of the motor. There are no air outlets on the sides of the motor.

In FIGURE 5 there is a shroud 43 around the motor 39 which is in contact with the partition 2 and which stops before it reaches the rear of the motor. In operation, this results in a low pressure area at the motor outlet 41 and a high pressure area at the motor inlet 40, while the fan 8 draws air from compartment 3 into compartment 5, thus causing cooling air to flow through the motor.

In FIGURE 6 the shroud 43 is not present. Conduit means 44 are connected to the motor air inlet 40 and communicate it with compartment 45 which compartment communicates directly with the panel filter 17 and is sealed from the motor compartment 3. In operation, the fan 8, in drawing air from the motor compartment 3, will also draw cooling air through the motor from the compartment 45, by means of conduit 44, motor air inlet 40 and motor air outlet 41.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:
1. A compressor unit comprising:
 (a) an enclosure,
 (b) partition means dividing said enclosure into a first compartment and a second compartment,
 (c) said enclosure having a first inlet means therein communicating with a source of air external of said enclosure,
 (d) a compressor having a suction and a discharge within said second compartment,
 (e) first conduit means connecting the suction of said compressor with said first inlet means for drawing air into said compressor from without said enclosure,
 (f) second conduit means carrying the discharge of said compressor out of said enclosure,
 (g) a motor within said first compartment having a shaft coupled to said compressor,
 (h) said enclosure having a second inlet means therein communicating with said first compartment with a source of air external of said enclosure,
 (i) said enclosure having an outlet means therein communicating said second compartment with the air external of said enclosure, and

(j) fan means mounted on said shaft between said first and second compartments for drawing cooling air from without said enclosure through said second inlet means, and through and across said motor, and discharging said cooling air into said second compartment and out of said enclosure through said outlet means.

2. A unit as in claim 1 wherein:
(a) a first filter means is disposed on said enclosure in said first inlet means to filter the air being drawn into said compressor, and
(b) a second filter means is disposed on said enclosure in said second inlet means, to filter the cooling air being drawn in said enclosure.

3. A unit as in claim 1 wherein:
(a) said motor is covered by a shroud,
(b) said motor having a frame with air outlet ports and air inlet ports disposed therein, and
(c) said shroud coacting with said motor frame and said outlet ports, in operative association with the cooling air being drawn through said inlet ports and said first compartment by said fan means, to increase the flow of cooling air through and across said motor.

4. A unit as in claim 2 wherein:
(a) said motor having a frame with air inlet ports and air outlet ports disposed therein,
(b) conduits connect said air inlet ports of said motor frame,
(c) said enclosure having a third inlet means therein communicating said last mentioned conduits with a source of air external of said enclosure, which third inlet means has a larger ratio of area to air flow than said second inlet means,
(d) a third filter means disposed on said enclosure in said third inlet means to filter the air being drawn into and through said motor, which third filter means has a larger ratio of area to air flow than said second filter means, and
(e) said second inlet means having a restriction therein to reduce the flow of air therethrough, whereby said second and third filter means and said second and third inlet means coact with said fan means, said partition, said last mentioned conduit means and said first compartment to produce a steady flow of cooling air through said motor.

5. A unit as in claim 3 where said shroud contacts said partition means.

6. A unit as in claim 5 wherein:
(a) said partition means comprises a partition extending from side to side and top to bottom of said enclosure, thereby making separate air chambers of said first and second compartments,
(b) said partition having a hole therein, and
(c) said fan means being mounted in said hole in the plane of said partition.

References Cited
UNITED STATES PATENTS

| | | | |
|---|---|---|---|
| 1,342,592 | 6/1920 | Orr | 230—117 |
| 2,307,785 | 1/1943 | Merrill | 310—62 |
| 2,328,038 | 8/1943 | Taylor | 230—117 |
| 3,156,409 | 11/1964 | F. Paugh | 230—211 |

ROBERT M. WALKER, *Primary Examiner.*